Patented Dec. 18, 1951

2,579,381

UNITED STATES PATENT OFFICE 2,579,381

CELLULOSE DERIVATIVE COMPOSITION OF IMPROVED SOLUBILITY

George Otis Funderburk, Upper Penn's Neck, N. J., assignor to E. I. du Pont de Nemours and Company, Wilmington, Del., a corporation of Delaware No Drawing. Application October 5, 1949, Serial No. 119,769

4 Claims. (Cl. 106—194)

This invention relates to compositions containing an alkali-metal carboxymethyl cellulose or a similar water-soluble cellulose derivative.

It is an object of this invention to provide a method for facilitating the dissolution of sodium carboxymethyl cellulose or sodium hydroxyethyl cellulose in water. A further object is to provide novel compositions of matter adapted for addition to synthetic detergents to improve their physical characteristics and to enhance the cleansing property thereof. Additional objects and effects will become apparent as the description proceeds.

Sodium carboxymethyl cellulose has been recognized in the art as a valuable adjuvant to soap and synthetic detergents. Its value springs from the fact that it inhibits redeposition upon the fiber being laundered the soil removed therefrom, thus making the laundering an essentially irreversible process. A similar effect has been observed in sodium hydroxyethyl cellulose and other water-soluble cellulose derivatives.

The quantity of cellulose derivative required for such purposes is small, usually of the order of 5% by weight based on the weight of active detergent in the composition. The mode of incorporation, however, generally requires the preparation first of an aqueous solution of the cellulose derivative. But sodium carboxymethyl cellulose and sodium hydroxyethyl cellulose have the property of going but very slowly into solution. Consequently, prolonged stirring and heating are ofter required to achieve dissolution. In fact, carboxymethyl cellulose cannot be dissolved in conventional laundry operations where the clothes are already present in the water.

I have now found that the speed with which sodium carboxymethyl cellulose goes into solution in water may be greatly increased, and rendered practically instantaneous, if the process is effected in the presence of an aluminum polyborate, that is the gelatinous, water-dispersible reaction product of a water-soluble aluminum salt with a water-soluble borate. Such reaction products and their mode of preparation are discussed more in detail in my copending application, Serial No. 119,768, of even date herewith, wherein I have given them all the generic name aluminum polyborates.

They may be expressed by the general formula $xAl_2O_3.yB_2O_3$, wherein $x$ and $y$ are integers and wherein $y$ is from 3.5 to 27 times the value of $x$. Their mode of preparation consists essentially of warming at 60° to 70° C. an aqueous solution of the two mentioned salts in molar proportions corresponding to $x$ and $y$ respectively. In the case of aluminum sulfate and sodium tetraborate (anhydrous borax) the said proportions imply using from 1 to 8 parts by weight of the tetraborate for each part of aluminum sulfate, but more commonly the range will be from 1.5 to 2.5 parts of the former to 1 part of the latter. The reaction products may be isolated in dry form by spray-drying or drum-drying, but for many practical purposes the aqueous reaction mass containing the initial reactants in the preferred proportions (within the limits of $x$ and $y$ above) is suitable. All these variations seem suitable also for the purpose of my present invention.

Whether the action of such aluminum polyborates upon sodium carboxymethyl cellulose is of a hydrotropic nature, or whether the two react chemically to form some sort of a loosely held chemical complex, is not clear to me at the moment. I have observed, however, that when the resulting mixture is dried to a powder and incorporated into a solid detergent composition, each of the initial ingredients of said mixture exerts its own beneficial effect upon the detergent, as if it were free. Thus, the detergent acquires improved physical stability toward moisture, just as if it were treated independently with aluminum polyborate according to my said copending application, Serial No. 119,768. Likewise, when fabric is laundered with said detergent, tests show that the sodium carboxymethyl cellulose component of the aforementioned mixture exerts its characteristics beneficial effect upon the process, namely hindering redeposition of the soil from the laundering bath upon the fiber, just as if it were used by itself in the same concentration. Therefore, if any chemical compounds are formed, they must be of an unstable character and readily dissociable into their initial components when dissolved in the laundering bath.

As already indicated, my procedure is to form a joint aqueous solution of the aluminum polyborate and sodium carboxymethyl cellulose, which is then evaporated to dryness. This may be achieved by dissolving the isolated solid aluminum polyborate and sodium carboxymethyl cellulose jointly in water. Alternatively, I may dissolve the cellulose compound in the aqueous reaction mass in which the polyborate has been formed, for instance from aluminum sulfate and borax. Subsequent evaporation of the said joint solution or reaction mass produces the desired intimate association of the polyborate and carboxymethyl cellulose, to endow the entire composition with quick dissolving properties.

To produce a good effect, the quantity of polyborate should be not less than 10% by weight of the sodium carboxymethyl cellulose. But there is no upper limit; and if the composition is to be used as an adjuvant to detergents, it is desirable to have a large excess of the aluminum polyborate, so that the latter may stabilize the detergent against atmospheric humidity in accordance with the teachings of my copending application Serial No. 119,768.

The product may be isolated in dry form by evaporating the reaction mass, for instance in a spray drier or drum. The resulting solid, upon being milled to the desired degree of fineness, may be mixed with powdered soap or synthetic detergent in any convenient manner, for instance milling.

In the case of synthetic detergents which are produced by spray-drying or drum-drying of an aqueous reaction mass, incorporation may be achieved also by admixing the said drum-dried powder or the aqueous mixture of aluminum polyborate and sodium carboxymethyl cellulose with the aqueous paste of the detergent, and drying the resulting paste in any convenient matter.

In addition to soap itself, the following synthetic detergents come into consideration for the purpose of this invention:

Long-chain alcohol sulfates, for instance sodium dodecyl sulfuric acid ester, sodium octadecyl surfuric acid ester, etc.; the alkane-sulfonate type, for instance the products prepared according to U. S. Patents Nos. 2,174,110 and 2,239,974; the alkaryl sulfonate type, for instance dodecyl - benzene - sodium sulfonate (U. S. P. 1,992,160 and 2,232,118) and related products; the sulfo-alkyl-acylamide type, for instance the compounds

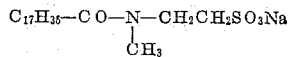

of U. S. P. 1,932,180; the oxo-alcohol-sulfate type obtained from by-products in the Fischer-Tropsch synthesis, for instance the product described in F. I. A. T. Final Report No. 1000 (O. T. S., Department of Commerce, Washington, D. C.); the long-chain alkyl betaine type, for instance C-cetyl betaine, described in U. S. P. 2,129,264.

By the same procedures other water-soluble assistants, adjuvants or builders may be incorporated into the principal composition of this invention, for instance, sodium sulfate, sodium carbonate, sodium silicate (meta or sesqui), sodium pyrophosphate, and the like.

In all the aforegoing discussion and formulations, sodium hydroxyethyl cellulose may be admixed with or substituted for sodium carboxymethyl cellulose, or the corresponding potassium compounds may be employed with equally advantageous results.

Without limiting my invention, the following examples are given to illustrate my preferred mode of operation. Parts mentioned are by weight.

Example 1

To 2500 parts of water, at 65°–70° C., was added and dissolved a quantity of crystalline aluminum sulfate corresponding to 3 parts of $Al_2(SO_4)_3$. To this solution was added, slowly a quantity of powdered borax corresponding to 6 parts of $Na_2B_4O_7$. Mixing was continued for 3 minutes. To the reaction mass was dropped in a quantity of powdered, high viscosity type, sodium carboxymethyl cellulose (degree of etherification—0.70; viscosity of 1% solution—1000 cps.) corresponding to 84 parts of sodium carboxymethyl cellulose and also containing 8 parts of sodium chloride. Mixing was continued until the sodium carboxymethyl cellulose was dissolved, whereupon the mass was dried to a powder on a drum dryer.

Using a quantity of water at 65°–70° C. and a high speed agitator, a solution containing 1% sodium carboxymethyl cellulose was prepared by slowly dropping in the appropriate amount of the product prepared above, with the agitator running full speed. In two minutes after the first addition of this product, solution appeared complete.

In a similar manner, a 1% solution of sodium carboxymethyl cellulose was prepared, using the original powdered sodium carboxymethyl cellulose product. In this case, solution was slow and difficult. More than 10 minutes were required for complete solution.

The composition of this example was found to possess, undiminished, all the abilities of sodium carboxymethyl cellulose with respect to the prevention of redeposition of soil on cotton textiles.

Example 2

In a similar manner, using 1000 parts of water, a composition was prepared which contained 5 parts of $Al_2(SO_4)_3$, 10 parts of $Na_2B_4O_7$ and a quantity of a different grade of sodium carboxymethyl cellulose corresponding to 46 parts of active ingredient and also containing 39 parts of NaCl (degree of etherification—0.45; viscosity of 2% solution—30 cps.).

The rate of solution of the product of this example was compared to that of the original sodium carboxymethyl cellulose as in Example 1. In making a 2% active ingredient solution in water, the composition of this example dissolved almost instantly, while at least five minutes were required to dissolve the original, untreated, sodium carboxymethyl cellulose product.

The grade of sodium carboxymethyl cellulose employed in this example was one commonly used as a detergent assistant. Normally, it cannot be added directly to a tub of wet clothes, because under these conditions it leaves lumps of undissolved sodium carboxymethyl cellulose in the clothes. On the other hand, the product of this example has been found to dissolve completely and almost instantly in a batch of wet clothes, at the concentrations normally used. It also possesses, undiminished, its normal power to prevent the redeposition of soil on cotton cloth.

Example 3

Using 200 parts of water at 65°–70° C., a reaction mass was prepared, as in Example 1, which contained 5 parts of $Al_2(SO_4)_3$ and 10 parts of $Na_2B_4O_7$. To this reaction mass was added a quantity of hydroxyethyl cellulose corresponding to 15 parts. The mass was agitated until this last ingredient was dissolved, whereupon the solution was dried to a powder on a drum dryer.

In a similar manner, the rate of solution of the product of this example was compared to that of the original hydroxyethyl cellulose. In making a 1% active ingredient solution in water, the composition of this example dissolved completely in four minutes while the original hydroxyethyl cellulose was so difficult to dissolve that it required pasting with water, allowing to stand overnight, and completing the solution the next day.

Example 4

A quantity of aluminum sulfate corresponding to 5 parts of $Al_2(SO_4)_3$ and a quantity of borax corresponding to 10 parts of $Na_2B_4O_7$ were reacted together in 500 parts of water as in the foregoing examples. Into the resulting solution 1 part of sodium carboxymethyl cellulose was dropped with stirring until dissolved. To the subsequent reaction mass 18 parts of tetrasodium pyrophosphate were added. The mass was then stirred for fifteen minutes, at which time it was observed to be a clear solution. It was then dried to a powder upon a drum dryer.

Example 5

A quantity of aluminum sulfate, corresponding to 5 parts of $Al_2(SO_4)_3$ and a quantity of borax corresponding to 10 parts of $Na_2B_4O_7$ were reacted together in 350 parts of water as in the foregoing examples. Six parts (anhydrous basis) of sodium sesquisilicate were dropped into the resulting solutions with stirring until dissolved. Into the reaction mass was then dropped in one part of sodium carboxymethyl cellulose, with stirring until dissolved. The reaction mass was dried to a powder on a drum dryer.

In a similar manner, compositions containing various other proportions of aluminum polyborate and the water-soluble viscous cellulose derivative may be prepared, as well as compositions containing various additional water-soluble ingredients which are desirable in detergents. Furthermore, although I have emphasized the practical value of my novel compositions of matter as adjuvants for soaps or detergents, it will be noted here that sodium carboxymethyl cellulose and sodium hydroxyethyl cellulose have various other important industrial uses, among which may be mentioned their use as emulsifiers, protective colloids, thickeners, sizing agents and protective films, by themselves or in conjunction with various water-soluble plasticizers and gums, in the textile, leather and paper industries. My invention provides a method for preparing the cellulose derivative in a quickly dissolving form for any and all such uses which are not incompatible with the presence of a small quantity of aluminum polyborate.

I claim as my invention:

1. A composition of matter comprising a water-soluble cellulose derivative of the group consisting of the alkali-metal carboxymethyl-celluloses and alkali-metal hydroxyethyl celluloses, and a water-dispersible aluminum polyborate in quantity not less than 10% by weight of said water-soluble cellulose derivative, said aluminum polyborate being the water-dispersible reaction product obtained by reacting in aqueous medium a quantity of a water-soluble aluminum salt equivalent to 1 part by weight of aluminum sulfate with a quantity of a water-soluble borate equivalent to from 1 to 8 parts by weight of anhydrous borax, and said composition being characterized by a higher speed of dissolution than that of said water-soluble cellulose derivative when taken by itself.

2. A composition of matter as in claim 1, comprising further a detergent builder, whereby the entire composition is adapted for incorporation into synthetic detergents to give them improved detergent qualities.

3. A composition of matter comprising sodium carboxymethyl cellulose and an aluminum polyborate obtained by reacting in aqueous medium 1 part by weight of aluminum sulfate with from 1.5 to 2.5 parts by weight of sodium tetraborate, said aluminum polyborate being present in quantity not less than 10% by weight of said sodium carboxymethyl cellulose, and said composition being characterized by a higher speed of dissolution than that of sodium carboxymethyl cellulose when taken by itself.

4. A composition of matter as in claim 3, comprising further a detergent builder, whereby the entire composition is adapted for incorporation into synthetic detergents to give them improved detergent qualities.

GEORGE OTIS FUNDERBURK.

REFERENCES CITED

The following references are of record in the file of this patent:

UNITED STATES PATENTS

| Number | Name | Date |
|---|---|---|
| 2,331,858 | Freeman | Oct. 12, 1943 |
| 2,331,859 | Roberts | Oct. 12, 1943 |
| 2,340,072 | Medl | Jan. 25, 1944 |
| 2,362,761 | Medl | Nov. 14, 1944 |